United States Patent
Gmerek et al.

(10) Patent No.: US 9,377,306 B2
(45) Date of Patent: Jun. 28, 2016

(54) DEVICE AND METHOD FOR PREDICTION ON THE GROUND OF CHARACTERISTICS OF THE POSITION OF AN AIRCRAFT ALONG A PATH

(71) Applicant: AIRBUS OPERATIONS S.A.S., Toulouse (FR)

(72) Inventors: Philippe Gmerek, Toulouse (FR); Jean-Damien Perrie, Toulouse (FR); Alain Guillet, Blagnac (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 236 days.

(21) Appl. No.: 14/334,812

(22) Filed: Jul. 18, 2014

(65) Prior Publication Data
US 2015/0219460 A1 Aug. 6, 2015

(30) Foreign Application Priority Data
Jul. 22, 2013 (FR) ...................................... 13 57191

(51) Int. Cl.
| | |
|---|---|
| *G01C 21/00* | (2006.01) |
| *G05D 1/10* | (2006.01) |
| *G01S 19/15* | (2010.01) |
| *G01S 19/18* | (2010.01) |
| *G01S 19/13* | (2010.01) |

(52) U.S. Cl.
CPC .................. *G01C 21/00* (2013.01); *G01S 19/13* (2013.01); *G01S 19/15* (2013.01); *G01S 19/18* (2013.01); *G05D 1/101* (2013.01)

(58) Field of Classification Search
CPC ......... G01C 21/00; G01S 19/13; G01S 19/15; G01S 19/18; G05D 1/101
See application file for complete search history.

(56) References Cited

U.S. PATENT DOCUMENTS

| | | | | |
|---|---|---|---|---|
| 5,436,632 A | * | 7/1995 | Sheynblat | G01S 5/02 342/357.64 |
| 5,623,414 A | * | 4/1997 | Misra | G01S 19/20 342/357.59 |
| 5,923,286 A | * | 7/1999 | Divakaruni | G01C 21/165 342/357.44 |
| 6,711,478 B2 | * | 3/2004 | Hilb | G05D 1/0607 340/970 |
| 6,804,585 B2 | * | 10/2004 | Humbard | G01C 23/00 340/961 |
| 7,690,603 B2 | * | 4/2010 | Peyrucain | G01C 21/165 244/183 |
| 7,711,482 B2 | * | 5/2010 | Coatantiec | G01C 21/165 342/357.31 |

(Continued)

OTHER PUBLICATIONS

Blomenhofer et al, Accuracy, Integrity and Availability of GLS Based Autopilot Coupled Aircraft Landings, 52nd AM—Proceedings of the 52nd Annual Meeting of the Institute of Navigation, Jun. 21, 1996, pp. 433-441, The Institute of Navigation, 8551 Rixlew Lane Suite 360, Manassas, VA 20109, USA.

(Continued)

*Primary Examiner* — Nicholas Kiswanto
(74) *Attorney, Agent, or Firm* — Ingrassia Fisher & Lorenz, P.C.

(57) ABSTRACT

A prediction device for prediction on the ground of characteristics of the position of an aircraft along a path is provided. The prediction device comprises a calculation element comprising a performance and integrity model consistent with a model on board an aircraft. The second calculation element determines precision, integrity and availability information concerning the position of the aircraft along a flight and/or ground path. The integrity information taking account of an integrity of a satellite positioning system and at least one hardware integrity on board the aircraft.

12 Claims, 1 Drawing Sheet

(56) References Cited

U.S. PATENT DOCUMENTS

| | | | | |
|---|---|---|---|---|
| 7,783,425 B1* | 8/2010 | Hwang | ............... | G01S 19/20 701/1 |
| 7,908,046 B2* | 3/2011 | Huynh | ............... | G01C 21/00 340/945 |
| 7,956,802 B1* | 6/2011 | Hwang | ............... | G01S 19/20 342/357.31 |
| 8,108,146 B2* | 1/2012 | Guillet | ............... | G01C 21/30 701/411 |
| 8,760,343 B2* | 6/2014 | Milyutin | ............... | G01S 19/20 342/357.27 |
| 2008/0218434 A1* | 9/2008 | Kelly | ............... | G02B 27/01 345/8 |
| 2010/0026567 A1* | 2/2010 | Coatantiec | ........... | G01C 21/165 342/357.62 |
| 2011/0084874 A1* | 4/2011 | Coatantiec | ............. | G01S 19/20 342/357.3 |
| 2012/0004846 A1* | 1/2012 | Coatantiec | ........... | G01C 21/165 701/470 |
| 2012/0041676 A1 | 2/2012 | Bouniol et al. | | |
| 2012/0092193 A1 | 4/2012 | Perrie et al. | | |
| 2013/0138338 A1* | 5/2013 | Behara | ................... | G01S 19/20 701/458 |
| 2013/0271315 A1* | 10/2013 | Trautenberg | ............ | G01S 19/20 342/357.45 |

OTHER PUBLICATIONS

French Patent and Trademark Office, French Search Report for Application No. 1357191, mailed May 27, 2014.

* cited by examiner

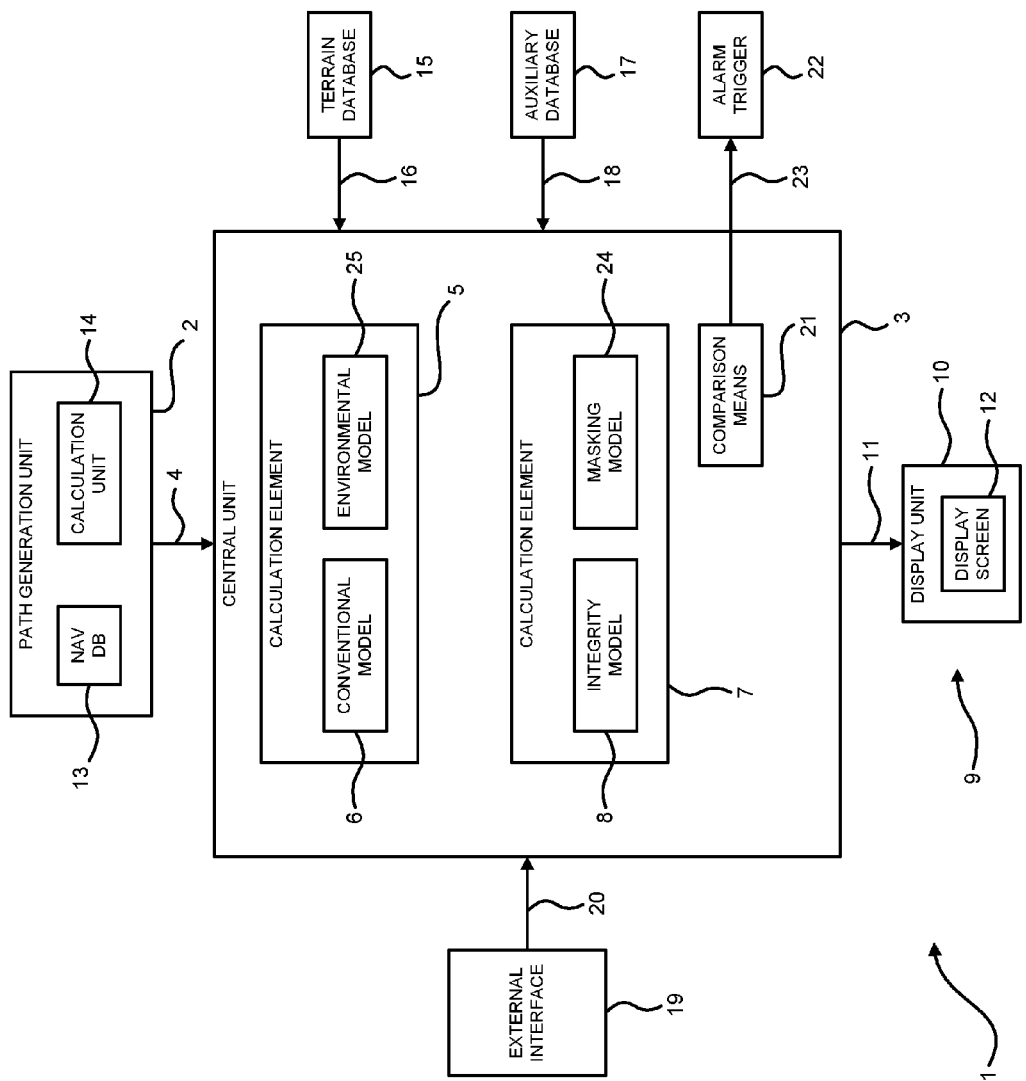

DEVICE AND METHOD FOR PREDICTION ON THE GROUND OF CHARACTERISTICS OF THE POSITION OF AN AIRCRAFT ALONG A PATH

CROSS-REFERENCE TO RELATED APPLICATION

This application claims priority to French Patent Application No. 13 57191, filed Jul. 22, 2013, which is incorporated herein by reference in its entirety.

TECHNICAL FIELD

The technical field relates to a device and a method for prediction on the ground of characteristics such as the precision, the integrity and the availability of the position of an aircraft, in particular a transport aeroplane, along a path.

BACKGROUND

It is known that a system of positioning a transport aeroplane (on the ground and in flight) is generally based on GPS/GNSS signals relating to positioning satellites. The synchronisation of signals is obtained by atomic clocks on board each satellite. The receiver installed on board the aeroplane compares the offset of the signal received in relation to the signal generated locally in the receiver and thus measures the distance from the satellite. These measurements are repeated on all the visible satellites (that is to say on all the satellites for which a signal is received on the aeroplane) and make it possible to calculate a position continuously.

Any measurement of distance, regardless of the system used (low earth orbit or geostationary satellite constellation or local beacon), places the receiver (mounted on the aeroplane) on a sphere centred on the transmitter. Using at least three transmitters, these spheres have a single point of intersection. However, this simple principle is complicated. This is because: the local clock of the receiver rarely has atomic precision. Therefore only the time differences are precise, which requires four beacons or satellites in order to define a point instead of three (if the altitude is known, three beacons are sufficient); the receiver is movable, and the measurements are therefore performed at different points; and the radio waves for transmission of the signals have a speed which is slightly variable depending upon the ionospheric layers through which they pass.

The position signal receiver incorporates these various errors, using corrections and measurements from various satellites or beacons, and integration and filtering techniques such as Kalman filters, in order to obtain the most probable point and its estimated precision and speed as well as the universal time.

For precision applications or procedures, such as a procedure of the RNP (Required Navigation Performance) type for example, requiring absolute security of navigation of the aircraft (navigation procedures in restricted corridors up to 0.1 NM), the navigation signals are supplemented by a so-called "integrity" signal which makes it possible to eliminate any measurement coming from a transmitter which is defective temporarily or for a prolonged period. The integrity is a measure of the confidence which the user can have in the quality of the outputs from the system (that is to say the information supplied by the system).

On board aeroplanes, calculation means are generally used for calculating the position based on hybridisation between GPS/GNSS data and inertial data of the IRS (Inertial Reference System) type. GPIRS (Global Positioning/Inertial Reference System) hybridisation consists of damping or stabilising the divergent errors of an inertial navigation unit by means of a positioning measurement derived from GPS/GNSS data.

It is known that, in the context of air transport, before performing air operations in the take-off, approach, landing phase etc., in accordance with the regulations in force, in particular operations of the RNP type, the airline companies are requested to proceed with a prediction on the ground of the availability of the hybrid position and the associated integrity, in the zone and at the time planned for landing the aircraft.

In the conventional manner, an algorithm of the GPIRS Kalman filter of an inertial unit is modelled in ground prediction software. This ground prediction software then makes it possible to make a prediction, before the departure of the aircraft, of the precision, the availability and the integrity of the aeroplane position calculated by the GPIRS Kalman filter, at the given point(s) and the given instant(s).

However, the conventional tools for prediction of the precision, the integrity and the availability of the aeroplane position (GPS/GNSS or GPIRS) have different limitations, in particular no ground prediction tool covers the monitoring of the onboard hardware integrity in the calculation of the total integrity of the position.

In addition, other objects, desirable features and characteristics will become apparent from the subsequent summary and detailed description, and the appended claims, taken in conjunction with the accompanying drawings and this background.

SUMMARY

Accordingly, the present disclosure provides a device for prediction on the ground of characteristics (precision, integrity and availability) of the position of an aircraft along a path, which makes it possible to remedy the above drawbacks.

To this end, according to the various teachings of the present disclosure, said prediction device is remarkable in that it comprises at least: a path generation unit in order to supply a path of the aircraft comprising at least one of the following elements: a flight path and a ground path; a central unit comprising at least: a first calculation element comprising a model of the aircraft and determining the dynamics of the aircraft on the path; and a second calculation element comprising a performance and integrity model consistent with a model onboard the aircraft, which, with the aid of said performance and integrity model, taking into account the dynamics of the aircraft, said second calculation element, determines precision, integrity and availability information concerning the position of the aircraft along the path, said integrity information taking account of an integrity of a satellite positioning system used by the aircraft and at least one hardware integrity on board the aircraft along the path; and a unit for presenting said precision, integrity and availability information to a user.

Thus by virtue of the present disclosure a device is obtained for prediction on the ground of characteristics such as the precision, the integrity and the availability of the position of an aircraft, which takes into account the integrity of an onboard hardware part, which makes it possible to obtain a prediction device having complete coverage. Moreover, as the central unit of the prediction device contains a performance and integrity model which is consistent with a model onboard an aircraft, a prediction is obtained which is particularly precise and consistent with what the aircraft will experience in the course of the flight.

In one embodiment, said path generation unit comprises at least one of the following elements in order to supply a path of the aircraft: a database containing the path; and a calculation unit for determining the path.

Moreover, in one embodiment, said prediction device may also comprise at least some of the following elements: at least one database of the terrain; at least one auxiliary database containing information concerning satellites of a satellite positioning system; an external interface; and a means for comparison with a threshold of a global protection radius illustrating the calculated integrity, and a means for triggering an alarm in the event of said threshold being exceeded by said global protection radius.

Furthermore, said prediction device may comprise at least some of the following characteristics, taken individually or in combination: said second calculation element of the central unit comprises a satellite masking model, and determines and supplies an indication of the visible satellites along the path, with the aid of terrain information and information concerning satellites of a satellite positioning system; and said first calculation element of the central unit comprises an environmental model.

The present disclosure also relates to a method for prediction on the ground of characteristics (precision, integrity and availability) of the position of an aircraft along a path.

According to the various teachings of the present disclosure, said method of prediction comprises at least: receiving the path of the aircraft comprising at least one of the following elements: a flight path and a ground path; determining the dynamics of the aircraft on the path; calculating, with the aid of a performance and integrity model consistent with a model onboard an aircraft and taking into account the dynamics of the aircraft, precision, integrity and availability information concerning the position of the aircraft along the path, said integrity information taking account of an integrity of a satellite positioning system used by the aircraft and at least one hardware integrity on board the aircraft along the path; and presenting said precision, integrity and availability information to a user.

In one embodiment, a prediction of the aircraft position and of the position protection radii, illustrating the integrity, is calculated with the aid of the following expressions:

$$X(k+1)=F[Xm(k),X(k)]$$

$$Xm(k)=G[E(U(k)),M(U(k))]$$

in which:
  k is an iteration;
  X is the position of the aircraft;
  U represents a state vector used at the current moment at the input of the prediction calculation, covering the dynamic state of the aircraft and its environment;
  G represents a modelling function of masking M and sensor errors E, used at the input of the prediction of the position and of the protection radii: and
  F represents an iterative processing for calculation of the aircraft position prediction and position protection radii.

Furthermore, said method of prediction may comprise at least some of the following characteristics, taken individually or in combination: a comparison with a global protection radius threshold illustrating the calculated integrity, and a triggering an alarm in the event of said threshold being exceeded by said global protection radius. The global protection radius illustrating the integrity is calculated as the maximum at least of the following radii: a protection radius incorporating signal failures in space; a protection radius incorporating a hardware failure of a position calculator; and a protection radius incorporating a hardware failure of a satellite signal receiver. The method of prediction also comprises: determining and supplying an indication of the visible satellites along the path, with the aid of terrain information and information concerning satellites of a satellite positioning system, as well as a satellite masking model; and an estimate of the guidance error is added to a navigation error of the estimated position.

Furthermore, advantageously, at least one of the following default items of information is provided in the event of a problem in generating the corresponding effective information: a default marking angle; and a default path.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1 is a block diagram of a prediction device which illustrates an embodiment of the present disclosure.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

The device 1 shown schematically on the single FIGURE and illustrating an exemplary embodiment of the present disclosure is a device for automatic prediction on the ground, that is to say before a flight, of the precision, the integrity and the availability of the position of an aircraft along a path, in one example, a transport aeroplane.

According to the various teachings of the present disclosure, this prediction device 1 comprises: a path generation unit 2 in order to supply a path of the aircraft comprising a flight path and/or a ground path (intended to be followed by the aircraft); a central unit 3 which is connected by means of a link 4 to said unit 2 and which comprises at least: a calculation element 5 including a conventional model 6 of the aircraft and determining, with the aid of this model 6, the dynamics of the aircraft on the path; a calculation element 7 comprising a performance and integrity model 8 which is similar to and consistent with a conventional model (performance and integrity model) onboard the aircraft. Such a conventional model is well known. This calculation element 7 determines precision, integrity and availability information with the aid of the dynamics of the aircraft and said model 8. The integrity information takes account of both an integrity of a satellite positioning system used by the aircraft and at least one hardware integrity on board the aircraft along the path. This calculation element 7 checks the compliance with the performance required by the procedure envisaged for the aircraft (for example a procedure of the RNP type); and a unit 9 for presenting said precision and integrity information to a user.

In one embodiment, said unit 9 comprises a display unit 10 which is connected by means of a link 11 to the central unit 3 and which is configured to present this information on a display screen 12. The unit 9 may likewise correspond to any other conventional means for presenting said information.

Moreover, said path generation unit 2 comprises at least one of the following elements in order to supply a path of the aircraft, as specified below: a database 13 containing the path; and a calculation unit 14 for determining the path.

Furthermore, said prediction device 1 also comprises: at least one terrain database 15 (for example of the NDB (Navigation DataBase) type or of the AMDB (Aerodrome Mapping DataBase) type, as specified below) which is connected by means of a link 16 to the central unit 3; at least one auxiliary database 17 which is connected by means of a link 18 to the central unit 3 and which contains information concerning satellites of a satellite positioning system; and an external interface 19 which is also connected by means of a link 20 to the central unit 3 and which is intended for a user.

In one embodiment, said prediction device 1 also comprises: a comparison means 21 which is, for example, incorporated in the central unit 3 and which compares a global protection radius (illustrating the integrity) with a threshold; and a means 22 for triggering an alarm which is connected by means of a link 23 to the central unit 3 (and to said comparison means 21) and which is configured in order to trigger a conventional alarm, of a visual and/or acoustic type, in the event of said threshold being exceeded by said global protection radius.

Furthermore, in one embodiment: said calculation element 7 of the central unit 3 also comprises a satellite masking model 24 and it is configured to determine and supply an indication of the visible satellites along the path, with the aid of terrain information (received from the terrain database 15) and information concerning satellites from a satellite positioning system (received from the auxiliary database 17); and said calculation element 5 of the central unit 3 comprises an environmental model 25 (wind speed gradient, temperature and/or pressure, mass and/or centring, etc.).

Therefore the device 1 is a tool for prediction on the ground of the precision and the integrity of the position of an aircraft including the integrity of an onboard hardware part, the prediction taking account of information relating to the path supplied by a user (including if required the phases on the ground) and the associated terrain masking.

A path is characterised by a set of curves and straight segments placed end to end continuously, in order to form a continuous line on which the aircraft bases its guidance. As a function of the curves (larger or smaller radius of curvature, number of curved segments, number of changes of heading, intensity of roll), estimation of the errors of the position calculators varies and should be taken into account in order to calculate a protection radius including not only the state of the satellite constellation, but also an onboard hardware part.

All along a path comprising taxiing, a take-off, a landing, a cruising phase, an approach, a missed approach, etc. and in particular during RNP phases, the prediction device 1 including the onboard hardware part therefore makes it possible for a user to anticipate whether or not it is able to perform the envisaged operation by taking into account: parameters external to the aircraft by the calculation of the protection radius (or integrity radius) incorporating GPS/GNSS signal failures in space, of the $HIL_{SIS}$ (Horizontal Integrity Limit: Signal In Space) type; taking account of the terrain as a function of the position of the aircraft and calculation of the terrain masking in real time; taking account of a real path; taking account of the attitude of the aircraft (roll in particular); taking account of the state of the satellite constellation of the GPS system on this real path; taking account of the altitude of the aircraft; taking account of the distinction between the phases on the ground and in flight; and onboard parameters: estimation of the errors of the aircraft position calculators and calculation of the protection radius (or hardware integrity radius), of the $HIL_{H/W}$ (Horizontal Integrity Limit: HardWare on board) type.

The parameters which are useful for the prediction are input into the prediction device 1 by a user via the external interface 19, namely a dedicated human/machine interface or a web interface (client/server architecture).

Moreover, a navigation database 13, for example of the NDB (Navigation DataBase), contains all the information necessary for the production of a flight plan, and in one embodiment: air routes: waypoints; airports; runways; and radio navigation data.

This information is defined via the ARINC 424 standard. This database 13 is updated regularly (generally 28 days in civil aviation), usually on the ground before the flight. Thus the flight plan consists of a series of points of which the structure is defined by standards such as ARINC 424.

Consequently a database 13 of ground and flight paths, already constructed, is available.

The unit 2 may also have a path calculator 14 in order to calculate the path on the basis of a flight plan entered by the user (pilot or company). This path calculator 14 may be a dedicated calculator or a conventional flight management system referred to as FMS, suitable for calculating the path to be followed on the aircraft.

A calculation of surface path(s) is likewise possible, on the basis of information contained for example in airport databases of the AMDB (Aerodrome Mapping DataBase) type.

These paths, of which each point is known (for example one point per second), provide the prediction device 1 with information on: the aircraft fly-by points: date/time, latitude, longitude, altitude, attitude, speed, velocity, heading, acceleration, etc.; the radii of curvature of the path for the curved segments; the length of the straight segments; and the stimulation of the inertial sensors involved in the estimation of the precision and the integrity of the position of the aircraft and therefore in the estimation of the bias and errors introduced during taxiing, take-off, landing, cruising, approach, missed approach, etc.

In one embodiment, a prediction of the aircraft position and of the position protection radii, illustrating the integrity, is calculated in the prediction device 1 with the aid of the following expressions:

$$X(k+1)=F[Xm(k),X(k)]$$

$$Xm(k)=G[E(U(k)),M(U(k))]$$

in which:
k is an iteration;
X is the position of the aircraft;
U represents a state vector used at the current moment at the input of the prediction calculation, covering the dynamic state of the aircraft and its environment;
G represents a modelling function of masking M and sensor errors E (GPS, inertia, etc.) used at the input of the prediction of the position and of the protection radii HW (for the hardware integrity) and SIS (for the integrity of the signal in space); and
F represents an iterative processing of calculation for aircraft position prediction and protection radii HW and SIS of the position.

In order to be representative of the real behaviour of the aircraft and the availability of the navigation function onboard the aircraft, the algorithm for processing of satellite failures and therefore of the part of the signal in space (SIS) of the prediction device 1 is an image of a conventional algorithm for calculation of integrity present in the onboard equipment calculating the position of the aircraft. Thus, the prediction device 1 produces an early analysis of the availability of the function for the forthcoming operation or operations. The prediction device 1 is capable of calculating protection against signal failures in space (satellite failures) with a level of protection of $10^{-7}$. A level of protection of $10^{-7}$ means that the probability that the estimated point (GPIRS) is outside the protection radius of integrity is less than $10^{-7}$. The associated protection is referred to as the Horizontal Integrity Limit (HIL) and takes into account the effect of a satellite failure before the satellite is excluded by the detection and exclusion function. This protection with respect to satellite failures is included in the calculation of the global integrity protection radius, as specified below.

Therefore by virtue of the knowledge of the path and the principal characteristics thereof, the prediction device 1 makes it possible to improve knowledge of the behaviour of the inertial sensors involved estimating the position precision and the integrity calculation. The algorithm likewise makes it possible to process the hardware integrity (position calculator, GPS/GNSS receiver, etc.). This algorithm, the exact image of the onboard algorithm, incorporates the capacity to predict the calculation of the onboard hardware integrity $HIL_{H/W}$ along the path.

The prediction device 1 can take into account a plurality integrity values depending on the number of calculators involved in estimating this hardware integrity ($HIL_{H/W}$ for the position calculator, $HIL_{H/W}$ for the GPS/GNSS receiver).

The user of the prediction device 1 can therefore know whether or not the aircraft will remain within the alarm limit to be observed (of the NSE (Navigation System Error) type), in order to perform the operation. This alarm limit corresponds to the maximum authorised threshold used by the comparison means 21, taking into account the signal part in space and the onboard hardware part.

It will be noted that, before exclusion of a hardware redundancy (such as before exclusion of a GPS/GNSS satellite failure), the integrity protection radius increases in order to take into account the effect of the failure. Once the exclusion is carried out, the effect of the failure is always incorporated and the radius is always greater than if there had been no failure.

The global protection radius (global HIL) illustrating the integrity is calculated as the maximum at least of the following radii: a protection radius $HIL_{SIS}$ incorporating signal failures in space: a protection radius $HIL_{H/W}$ incorporating a hardware failure of a position calculator; and a protection radius $HIL_{H/W}$ incorporating a hardware failure of a satellite signal receiver.

If the comparison means 21 detects that global HIL>NSE, an alarm is emitted by the unit 22 and the user is informed that the procedure cannot be carried out.

Moreover, the calculation of the masking due to the terrain and to obstacles (typically within the meaning of the DO-272 and DO-276 standards) can be carried out on the basis of information available in terrain and obstacle databases, of the TODB (Terrain and Obstacle DataBase) type.

This calculation of the masking, carried out by the calculation element 7, may be performed all along the path at each defined point. The masking likewise depends upon the altitude and the attitude of the aircraft on the path, in particular the roll. It is therefore necessary to characterise the behaviour of the aircraft on the path by means of an aircraft model.

The result can be shown on a conventional path display, on which are displayed: parts of the path (shown for example in red), for which the alarm limit is exceeded by the integrity radius (SIS+H/W); and parts of the path (shown for example in green), for which the availability of the function is good.

Moreover, in one embodiment, said prediction device 1 takes into account a default masking angle, for example about 5°, on each point of the path. If the terrain database 15 is not available on a given path, a default masking angle may be applied at each point of the path in question. The availability is then slightly reduced since the default masking is a conservative value potentially excluding satellites, whilst said satellites were taken into account in the prediction with the terrain database 15.

In one embodiment, said prediction device 1 also takes into account a default path based on the DO 229 standard. If a path is not defined or if it is impossible to load a path, it is possible to define a default path to which a default masking angle is applied. This fall-back method has the advantage of introducing movements of the aircraft in a procedure with a first turn then a half-turn, thus introducing conservative bias in the navigation units, and enabling the algorithms for managing hardware failures to have inertial increments at input for coupling to the GPS/GNSS data.

Moreover, in one embodiment said prediction device 1 also takes a guidance error into account. In order to determine more precisely the conditions in a precision corridor for an RNP approach procedure, it is possible to estimate locally the wind speed gradient or variation in temperature/pressure or in the mass and centring of the aircraft along the approach path. Thus an estimate of the guidance error is available which is added (as a quadratic sum) to the navigation error of the estimated position. It is then possible to estimate anew the conditions for achieving the precision and integrity objectives as a function of environmental parameters (wind, temperature, pressure, etc.) or other parameters, such as mass or centring.

The prediction device 1 has the following characteristics and advantages: it enables a user to deselect one or more failed satellites which have been the subject of a communication. The predictions are then calculated without this or these satellite(s). The prediction device 1 is capable of calculating a protection against signal failures in space (satellite failures) with a level of protection of $10^{-7}$. The associated protection takes into account the effect of a satellite failure before the satellite is excluded by the detection and exclusion function. The prediction device 1 employs an algorithm for monitoring the GPS/GNSS integrity which is identical to the algorithm used by an airport system. The prediction device 1 likewise contains an algorithm which covers the effect of the onboard hardware on the calculation of the position. It is capable of calculating onboard hardware integrity protection with an appropriate level of protection. The prediction device 1 thus makes it possible to calculate an integrity protection radius including hardware failures and satellite failures, then to compare it with a limit fixed by a user, for example a limit which is a function of an RNP corridor to be flown on a path. The prediction device 1 by virtue of a database or specific means containing all the characteristics of paths published in the world (unit 2), it can cover prediction over the entire path, and not just at a single point or at a few points. The path is at least defined by a large number of points (which may be up to one or more points/second) for which the latitude, the longitude, the altitude and potentially the speed to be maintained are known. The flight path is likewise defined by curved segments, (of which the radius of curvature and the length are known) and of straight segments. The prediction device 1 makes it possible in particular to distinguish the ground phases and the flight phases in the calculation of the precision and of the integrity of the calculated position. The prediction device 1 makes it possible to calculate, at any point on the path, a mask depending on the surrounding terrain and obstacles, by virtue of a land and obstacle database 15. The masking angle is updated at each point of the path in order to optimise the prediction of the GPS/GNSS signals. As the masking angle likewise depends upon the altitude and the attitude of the aircraft, the prediction device 1 takes into account the altitude and the attitude (in particular the roll) of the aircraft on the path.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A device for prediction on the ground of characteristics of a position of an aircraft along a path, comprising:
    a flight path generation unit that supplies a path of the aircraft including at least one of a flight path and a ground path;
    a central unit comprising:
        a first calculation element including a model of the aircraft and that determines dynamics of the aircraft on the path; and
        a second calculation element including a performance and integrity model consistent with a model onboard the aircraft, which, with the aid of said performance and integrity model, taking into account the dynamics of the aircraft, determines precision, integrity and availability of information concerning the position of the aircraft along the path, said integrity information including an integrity of a satellite positioning system used by the aircraft calculated as a signal in space protection radius ($HIL_{SIS}$), a hardware integrity of a position calculator onboard the aircraft calculated as a first hardware protection radius ($HIL_{H/W1}$), and a hardware integrity of a satellite signal receiver onboard the aircraft calculated as a second hardware protection radius ($HIL_{H/W2}$); and
    a unit that presents said precision, integrity and availability information to a user;
    wherein the maximum of at least the $HIL_{SIS}$, the $HIL_{H/W1}$, and the $HIL_{H/W2}$ is compared to a navigation system error to indicate whether an aircraft procedure can be carried out.

2. The device according to claim 1, wherein said path generation unit comprises at least one of the following elements, in order to supply a path of the aircraft:
    a database containing the path; and
    a calculation unit that determines the path.

3. The device according to claim 1, further comprising at least one terrain database.

4. The device according to claim 1, further comprising at least one auxiliary database containing information concerning satellites of the satellite positioning system.

5. The device according to claim 1, wherein said second calculation element comprises a satellite masking model, and determines and supplies an indication of visible satellites along the path, with the aid of terrain information and information concerning satellites of the satellite positioning system.

6. The device according to claim 1, further comprising an external interface.

7. The device according to claim 1, further comprising a means that triggers an alarm in the event of said navigation system error being exceeded by said maximum of at least the $HIL_{SIS}$, the $HIL_{H/W1}$, and the $HIL_{H/W2}$.

8. The device according to claim 1, wherein said first calculation element also comprises an environmental model.

9. The device according to claim 1, wherein a prediction of the aircraft position and of a position protection radii, illustrating the integrity, is calculated with the aid of the following expressions:

$$X(k+1)=F[Xm(k),X(k)]$$

$$Xm(k)=G[E(U(k)),M(U(k))]$$

wherein:
k is an iteration;
X is the position of the aircraft;
U represents a state vector used at the current moment at the input of the prediction calculation, covering the dynamic state of the aircraft and its environment;
G represents a modelling function of masking M and sensor errors E, used at the input of the prediction of the position and of the protection radii; and
F represents an iterative processing of calculation for aircraft position prediction and position protection radii.

10. The device according to claim 1, wherein a global protection radius illustrating the integrity is calculated as a maximum at least of the following radii:
    a protection radius incorporating signal failures in space;
    a protection radius incorporating a hardware failure of a position calculator; and
    a protection radius incorporating a hardware failure of a satellite signal receiver.

11. The device according to claim 1, wherein an estimate of a guidance error is added to a navigation error of an estimated position of the aircraft.

12. The device according to claim 1, wherein at least one of the following default items of information is provided in the event of a problem in generating information to the user:
    a default masking angle; and
    a default path.

* * * * *